United States Patent [19]

Braithwaite et al.

[11] Patent Number: 4,771,878
[45] Date of Patent: Sep. 20, 1988

[54] PUSHER CYLINDER

[75] Inventors: David Braithwaite, South Yorkshire, England; Richard A. Walker, North Granby; Daniel W. Wartschow, Berlin, both of Conn.

[73] Assignee: Emhart Industries, Inc., Farmington, Conn.

[21] Appl. No.: 522,946

[22] Filed: Aug. 12, 1983

[51] Int. Cl.⁴ ............................................. B65G 25/00
[52] U.S. Cl. ................................ 198/468.01; 198/740; 65/260
[58] Field of Search ............... 198/490, 739, 740, 488, 198/430, 468.01, 740; 65/260; 74/829; 92/165 PR, 59

[56] References Cited

U.S. PATENT DOCUMENTS

| | | | |
|---|---|---|---|
| 1,572,647 | 2/1926 | Gartin | 74/829 |
| 2,509,475 | 5/1950 | Brosemer | 198/739 X |
| 4,119,017 | 10/1978 | Nusbaumer et al. | 92/165 PR X |
| 4,340,413 | 7/1982 | Rowland | 198/490 X |
| 4,373,840 | 2/1983 | Miller, Jr. | 198/339 X |

FOREIGN PATENT DOCUMENTS 2521364 11/1976 Fed. Rep. of Germany ... 92/165 PR

Primary Examiner—Joseph E. Valenza
Assistant Examiner—Mike Stone
Attorney, Agent, or Firm—Spencer T. Smith

[57] ABSTRACT

A pusher cylinder for moving one or more glassware articles from an associated dead plate through a predetermined arcuate path onto an adjacent moving conveyor. The pusher cylinder has a constant piston stroke length and rack and pinion for adjusting the position of the piston relative to the dead plate. Additionally, the pusher cylinder is provided with a splined central guide post for cooperative engagement with a complementarily splined bushing secured to one end of the piston of the pusher cylinder for providing longitudinal and rotational support for the piston.

3 Claims, 2 Drawing Sheets

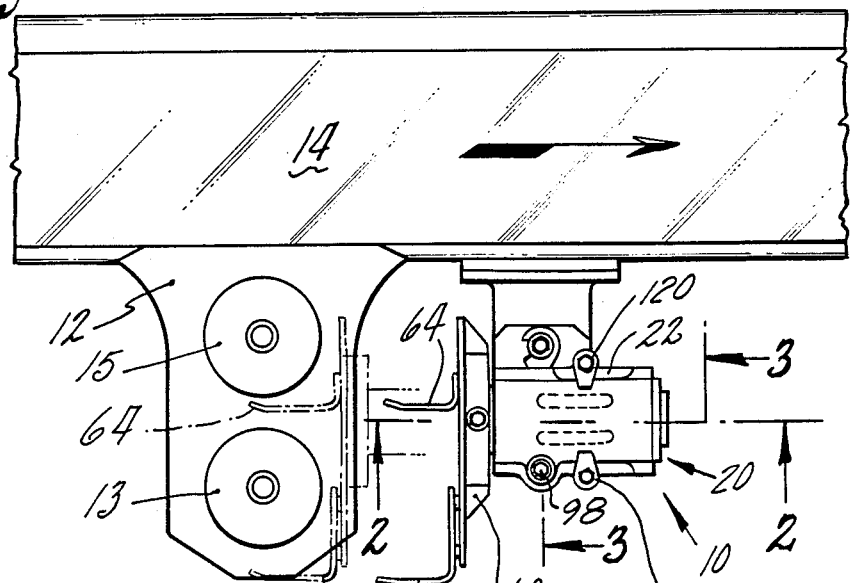
Fig.1
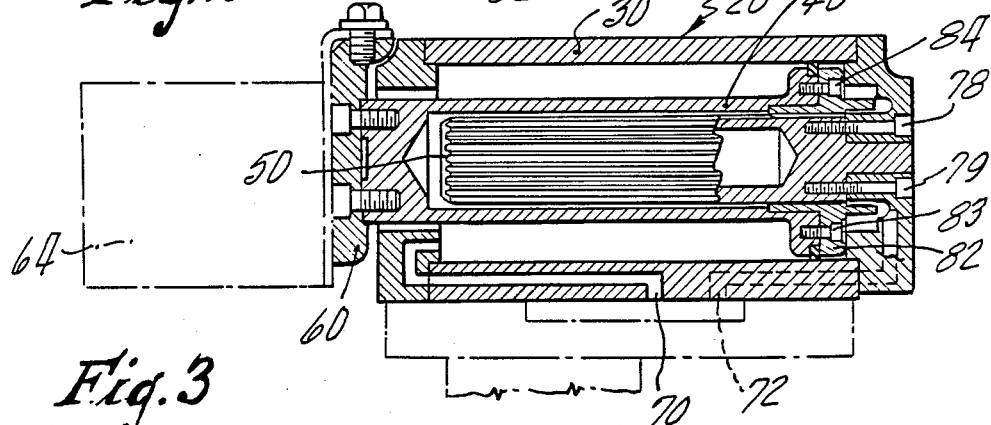
Fig.2
Fig.3

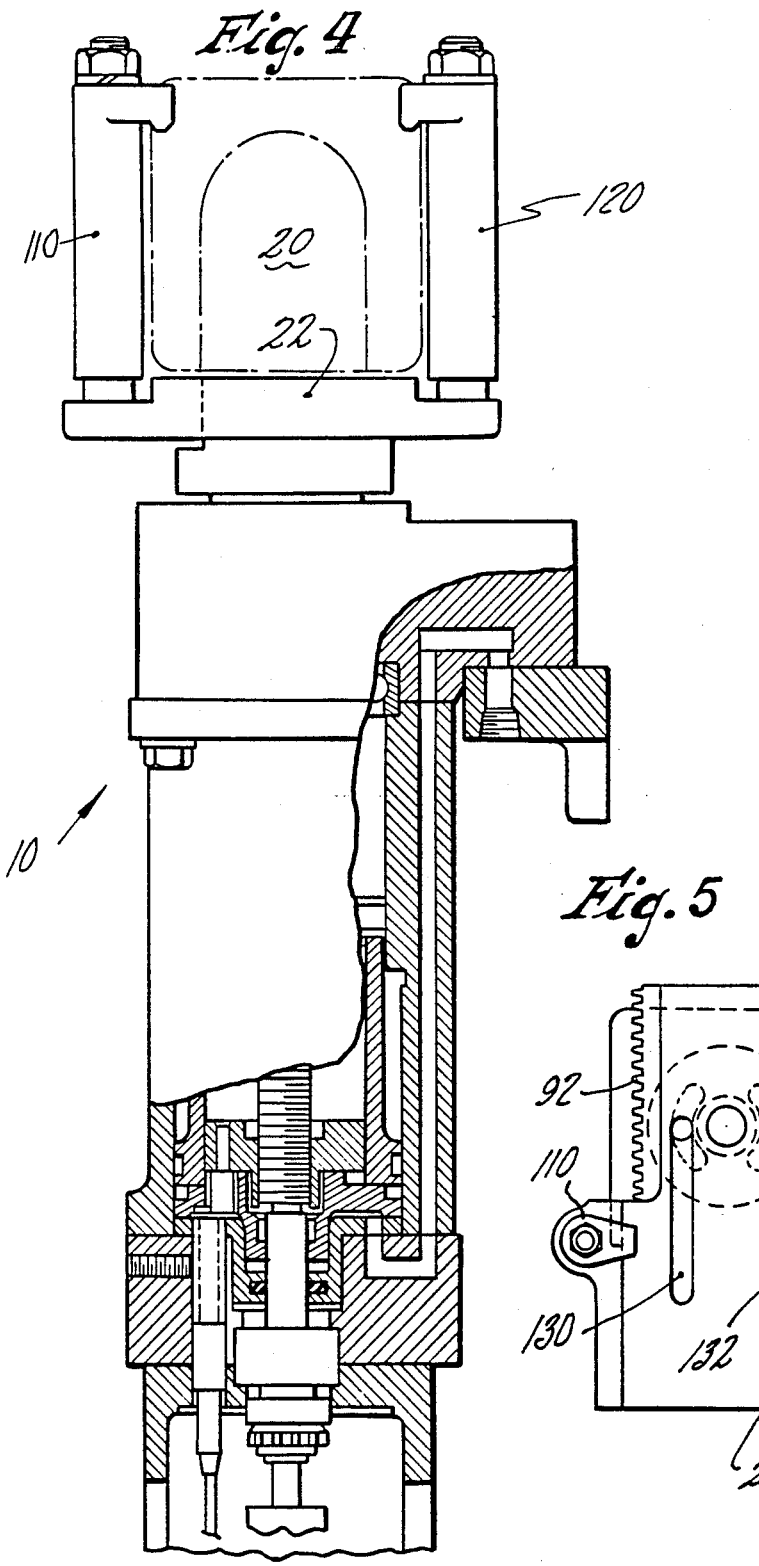

PUSHER CYLINDER

BACKGROUND OF THE PRIOR ART

1. Field of the Invention

The invention relates generally to improvements in pusher cylinders for use with glassware forming machines for moving finished glassware articles from an associated dead plate onto a moving conveyor.

2. Description of the Prior Art

Pusher mechanisms for moving glassware articles from a dead plate to a moving conveyor are well known in the prior art. These devices generally include a pneumatic pusher cylinder or head and a rotary actuator means for moving it through a predetermined arcuate path. In operation each pusher cylinder piston is extended, prior to the deposition of one or more glassware articles on a corresponding dead plate, in order to have the fingers be adjacent to the deposited bottles. Extention of the piston rod end is by conventional pneumatic means and positions fingers at the end of the piston rod near the glassware articles. Movement of the pusher cylinder through an arcuate path is an operating stroke which causes the fingers to contact the ware and move it outwardly through an angle of approximately 90° onto a moving conveyor. The piston rod is then retracted and the pusher cylinder returned inwardly on a return stroke in the opposite arcuate direction to complete the cycle.

Pusher cylinders must be adjusted from time to time in order to change the piston stroke length to accommodate different size ware. The piston stroke length adjustment means used in prior art pusher cylinders is generally cumbersome and inefficient. These adjustment means generally utilize mechanical stops to restrict piston stroke length and are thus obviously greatly subject to wear. Such stops may comprise, for example, stop nuts on a shaft external to the cylinder housing (as shown in U.S. Pat. No. 4,340,413) or a stop nut on a threaded rod coaxially aligned within a guide post in a piston (as shown in U.S. Pat. No. 3,559,537).

Also, prior art pusher cylinders use a variety of means to counteract the tendency of the moment arm created by the pusher fingers to cause the piston to rotate when it is extended: double parallel cylinders (U.S. Pat. No. 4,340,413), parallel guide rods (U.S. Pat. Nos. 4,203,752 and 3,559,537). These are relatively costly arrangements that are also subject to wear as well as differential thermal expansion which limits efficiency over a wide operating temperature range.

Accordingly, it is an object of this invention to produce a pusher cylinder having a more efficient stroke length adjustment means. It is yet another object of this invention to produce a pusher cylinder having a unique guide means to resist its rotational tendencies.

SUMMARY OF THE INVENTION

These and other objects of this invention are achieved by the preferred embodiment disclosed herein, wherein a pusher cylinder having a constant piston stroke length is provided with a means for adjusting the position of the piston relative to its corresponding dead plate by adjusting the position of the cylinder relative thereto. The adjusting means further comprises a rack secured to the turntable on which the cylinder is mounted and a cooperating pinion operatively secured to the cylinder. Additionally, the pusher cylinder invention disclosed herein includes a splined central guide post and cooperating bushing for providing support to the piston throughout its motion within the cylinder.

BRIEF DESCRIPTION OF THE DRAWINGS

FIG. 1 is a diagrammatic plan view of a pusher cylinder mounted adjacent a conveyor and a dead plate;

FIG. 2 is a side elevational view of a pusher cylinder taken along the lines 2—2 of FIG. 1;

FIG. 3 is a sectional view of the pusher cylinder and turntable shown in FIG. 1 taken along the lines 3—3;

FIG. 4 is a side elevational view of the pusher mechanism shown in FIG. 1 showing the pusher cylinder diagrammatically in phantom and showing a portion of the rotary actuator;

FIG. 5 is a plan view of FIG. 4 omitting the pusher cylinder for clarity.

DESCRIPTION OF THE PREFERRED EMBODIMENT

Referring now to the Figure, pusher mechanism 10 is shown in diagrammatic plan view adjacent dead plate 12 and conveyor 14. Pusher cylinder 20 is situated at the top of the pusher mechanism 10 and comprises cylinder body 30, hollow piston 40, splined center guide post 50 and pusher plate 60 (best seen in FIG. 2). Plate 60 has attached thereto pusher fingers 62 and 64. As shown in FIG. 1, fingers 62 and 64 may, upon extention of piston 40, be placed adjacent finished glassware article 13 and 15 on dead plate 12.

Pusher cylinder 20 is conventionally actuated pneumatically (or fluidically) by extend and retract air (fluid) appropriately directed to ports 70 and 72. The supply air to these ports is provided through supply ports and channels 130 and 132, respectively, (best seen in FIG. 5) in the turntable 22 to which cylinder 20 is mounted.

Splined guide post 50 is secured to the cylinder end cap by bolts 78 and 79. A complementarily splined bushing 82 is secured to the back end of piston 40 by bolts 83 and 84. Bushing 82 provides operative sliding engagement between piston 40 and guide post 50 while providing longitudinal support to the piston throughout its travel and also serves to resist any tendency of the piston to rotate about its axis. In prior art pusher cylinders, such rotation tendency is often encountered because of the moment arm created by the pusher plate and pusher fingers.

While the piston stroke length of pusher cylinder 20 is constant, the effective stroke length may be varied. Adjustment of effective stroke length to account for different ware sizes is accomplished by longitudinally adjusting pusher cylinder 20 relative to turntable 22 by means of rack and pinion assembly 90 which comprises rack 92 and pinion 94. As best seen in FIG. 3, rack 92 may be secured to turntable 22 by one or more bolts 96 or alternatively, rack 92 may be an integral part of the turntable. Pinion 94 is secured to the bottom end of adjusting bolt 98. Pusher cylinder 20 is provided with a lower key 100 for mating with a complementary longitudinal edge 102 of turntable 22. Since adjusting bolt 98 is rotatably secured within throughbore 104 of cylinder 30, rotation of adjusting bolt 98 will cause pusher cylinder 20 to move linearly along turntable 22. This in turn affects the position of the fingers at full extension of piston 40. Hold down clamp means 110 and 120 secure pusher cylinder 20 to turntable 22 to maintain the desired extension of fingers 62 and 64.

As best seen in FIG. 5, turntable 22 also includes extend and retract air channels 130 and 132. These channels maintain continuous operative engagement with ports 70 and 72, respectively, throughout the range of adjustment of cylinder 30. The additional channels shown in FIG. 5 in phantom do not form a part of this invention and are described in more detail in a co-pending application assigned to the assignee of the present invention. Similarly, the remaining details of FIG. 4 below the turntable 22 show a rotary actuator which is also described in a co-pending application assigned to the same assignee.

It will be understood by those skilled in the art that numerous modifications and improvements may be made to the preferred embodiment of the invention disclosed herein without departing from the spirit and scope thereof.

What is claimed is:

1. A pusher mechanism for a glassware forming machine for moving at least one glassware article through a predetermined arcuate path from an associated dead plate onto an adjacent moving cylinder, said pusher mechanism including a pusher cylinder, a piston mounted in said cylinder adapted to be moved therein and having a piston rod extending therefrom, said piston having a constant stroke length through each cycle of operation thereof, and means for adjusting the end portion of the piston rod relative to said dead plate by adjusting the position of the cylinder relative thereto.

2. The pusher mechanism of claim 1 wherein said pusher cylinder is mounted on a turntable and wherein said adjusting means further comprises a rack secured to one of said turntable or said pusher cylinder, a pinion operatively secured to the other of said turntable or said pusher cylinder, said pinion cooperating with said rack to move said pusher cylinder longitudinally relative to said turntable to thereby control the positioning of the end of the piston rod relative to said dead plate.

3. The pusher mechanism of claim 1 wherein said piston within said cylinder is hollow, and further including an internally splined bushing coaxially secured to said one end of said piston, a guide post coaxially secured within said cylinder and piston, said guide post complementarily splined to said bushing for mating therewith for providing support to said piston during its motion within said cylinder.

* * * * *